United States Patent [19]

Rougeot et al.

[11] Patent Number: 5,144,141

[45] Date of Patent: Sep. 1, 1992

[54] PHOTODETECTOR SCINTILLATOR RADIATION IMAGER

[75] Inventors: Henri M. Rougeot; Donald E. Castleberry, both of Schenectady, N.Y.

[73] Assignee: General Electric Company, Schenectady, N.Y.

[21] Appl. No.: 746,847

[22] Filed: Aug. 19, 1991

[51] Int. Cl.⁵ .............................. G01T 1/20
[52] U.S. Cl. ........................ 250/369; 250/366; 250/367; 250/370.08; 250/370.09; 250/370.1; 250/370.11
[58] Field of Search ............... 250/367, 366, 370.11, 250/370.1, 370.09, 370.08, 369

[56] References Cited

U.S. PATENT DOCUMENTS

| | | | |
|---|---|---|---|
| 3,797,802 | 3/1974 | Foote | 250/361 R |
| 3,936,645 | 2/1976 | Iversen | 250/486.1 |
| 4,437,007 | 3/1984 | Koslow et al. | 250/366 |
| 4,459,486 | 7/1984 | Brunner et al. | 250/367 |
| 4,672,207 | 6/1987 | Derenzo | 250/363.02 |

FOREIGN PATENT DOCUMENTS 60-117172 6/1985 Japan .................. 250/207

Primary Examiner—Constantine Hannaher
Attorney, Agent, or Firm—Donald S. Ingraham; James C. Davis, Jr.; Marvin Snyder

[57] ABSTRACT

A radiation imaging device has a plurality of scintillator elements that are each optically coupled to a plurality of internal gain photodetectors. Each photodetector is electrically coupled to a respective detect and hold circuit which amplifies and stores the pulse generated by the photodetector; the stored pulses are sampled via a multiplexed switching arrangement to allow the stored signal from each detect and hold circuit to be processed to produce a digitized imaging signal which corresponds to the energy level of, and location on the array of, the detected incident radiation. The digitized imaging signal is supplied to display memory and analysis equipment for the device.

16 Claims, 2 Drawing Sheets

PHOTODETECTOR SCINTILLATOR RADIATION IMAGER

Background of the Invention

This invention relates generally to radiation imaging systems and more particularly to high resolution gamma and x-ray cameras.

Radiation imaging systems are widely used for medical and industrial purposes. For example, in nuclear medicine, certain diagnostic tests involve the injection into the patient of radionuclides which will concentrate in an organ of interest. Radiation emitted from these radionuclides can be used for examining the organ's structure and its operation. Imaging systems have been developed which use the detected radiation to produce a signal which can be used to operate a visual display, such as a cathode ray tube or liquid crystal display device, or which can be used for other analysis of the pattern of detected x-ray or gamma ray radiation.

One example of such an imaging system is the Anger camera, which is commonly used in medical diagnostic procedures. In the Anger camera, incident radiation passes through a collimator before striking a scintillator layer. Light generated by the interaction of the incident radiation and the scintillator material then spreads out through an underlying light guide until it strikes an array of photomultipliers. The intensity of the light striking the individual photomultipliers varies dependent on the distance of the photomultiplier from the point where the incident radiation interacted with the scintillator to produce the initial light burst. A resistor network electrically determines the point of the radiation impact on the array based upon the magnitude of the respective electrical output of the photomultiplier devices in the array; summing the electrical output signals provides a measure of the energy level of the initial incident radiation. The low efficiency of the light guide and the poor photoemission conversion of the photomultipliers result in significant statistical fluctuation of collected light photons, causing degraded spatial and energy level resolution. Additionally, Anger cameras have relatively low count rates as every incident gamma ray that interacts with the scintillator material results in substantially the entire array being rendered non responsive until the light generated from the earlier interaction has diminished.

Another common prior art device is known as an image intensifier gamma camera. In such devices, the scintillator is shaped to be tightly coupled to the transparent window of a large field of view image intensifier tube, which discharges photoelectron energy packets in response to the light signal form the scintillator. The photoelectron packets are accelerated and focussed onto a cathodoluminescent phosphor deposited on a fiber optic output plate, generating additional light photon bursts. Multiple image intensifier stages can be coupled together to further amplify the signal. The final burst of photoelectrons will generate charges on a resistive charge divider from which the center of gravity of the pulse is reconstructed. Image intensifier cameras have substantial weight, size and expense which inhibits their practical use for many applications, such as medical imaging.

A solid state radiation detector is disclosed by S. E. Derenzo in U.S. Pat. No. 4,672,207. In the Derenzo device, radiation incident on the detector passes through a collimator and strikes a scintillator which is divided into rows and columns. An array of photodetectors divided into rows and columns underlies the scintillator such that each segment of the scintillator is positioned over a single photodetector. The photodetectors have common leads along each row and column, with one amplifier connected to each row and column (i.e., the total number of amplifiers equals the sum of the rows and the columns). The charge generated by a photodetector that is activated as a result of the absorption of incident radiation in the scintillator results in both the row amplifier and the column amplifier for that photodetector generating timing pulses, provided the magnitude of the charge sensed falls within an acceptable range. The timing pulses are used by a logic circuit to determine the location in the array of the radiation impact. In this design each photodetector in each row and column remains connected to its respective amplifiers at all times, with the impedance of amplifiers connected to unactivated photodetectors serving to insulate those photodetectors from the electrical signals generated by activated photodetectors. Thus, each event of detected incident radiation results in the remaining photodetectors on that row and column being "shut off", as any multiple activation of photodetectors on a given row or column is rejected by the position logic system. Additionally, the use of a larger number of photodetectors in a large array or to increase the resolution of the device rapidly results in very high impedances on the rows and columns which degrade the radiation detector's resolution and sensitivity.

Particularly for radiation imagers employed in medical procedures, in which it is desired to expose the patient to the minimum amount of ionizing radiation as possible, it is important that the imaging device be sensitive to low levels of radiation while still being able to discriminate against background radiation. Improved spatial resolution and energy level sensitivity require the use of a large number of photodetectors and a scintillator system which generates light photons only in the scintillator segment in which the incident radiation was absorbed.

It is thus an object of the present invention to provide an imaging device that exhibits a high degree of spatial and energy resolution.

Another object of the invention is to provide an efficient scintillator that minimizes generation of light photons from events other than radiation directly incident on the scintillator element.

It is a further object of this invention to provide a sensitive imaging signal processing system that allows the use of a large array of photodetectors.

SUMMARY OF THE INVENTION

In accordance with the present invention, a radiation imaging device has a plurality of scintillator elements arranged in an array and which are exposed to incident radiation. Each scintillator element is isolated from adjoining scintillator elements by an interstitial barrier. Clusters of internal gain photodetectors, such as four or more photodetectors, are optically coupled to each scintillator element. The electrical output signals from each photodetector are coupled to a subgroup processing circuit, with each subgroup processing circuit being coupled to a plurality of photodetectors. Each subgroup processing has detect and hold circuits for amplifying and storing signals generated by the photodetectors and multiplexing means for sampling these stored signals. The subgroup processing circuits have multiplexing means to sample the signals stored in the detect and hold circuits and to direct the sampled signals to a digital converter and a signal energy analysis circuit, which produces an imaging signal corresponding to the energy level and location of radiation incident on the scintillator array. A plurality of subgroup processing circuits are coupled to display memory and analysis equipment.

The scintillator elements are isolated from one another by radiation absorbent material in the interstitial barrier to minimize any incident or secondary radiation from passing between the scintillator elements. The radiation absorbent material typically has a high atomic number, making it relatively impermeable to the incident and secondary x- and gamma ray radiation in the detector. In such an arrangement a single ray of incident radiation will typically cause only one scintillator element to generate light, thus optimizing the spatial resolution of the imaging device.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which like characters represent like parts throughout the drawings, and in which:

DETAILED DESCRIPTION OF THE PREFERRED EMBODIMENT

Figure 1:
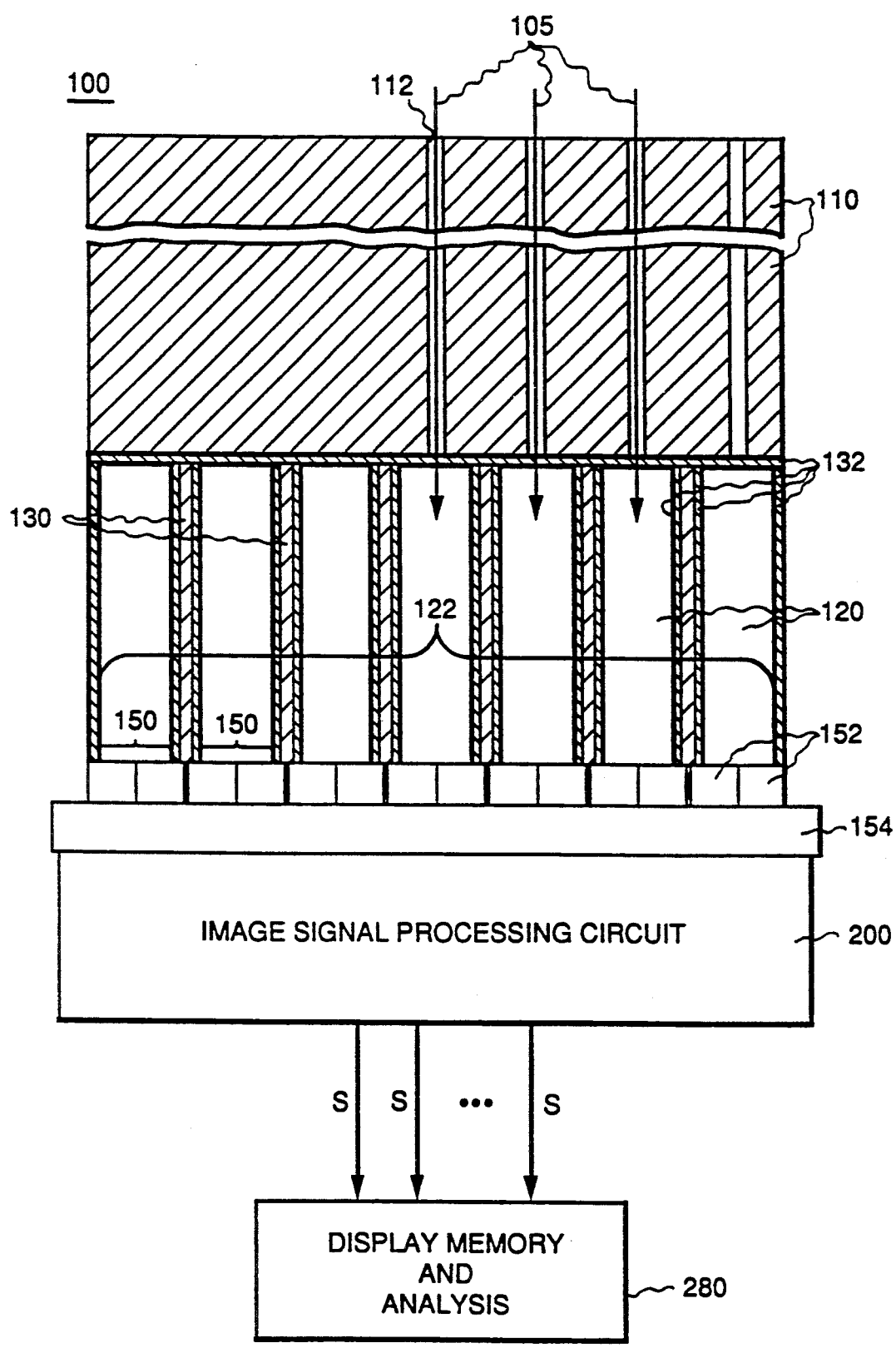
FIG. 1 is a partial cross-sectional view of a device constructed in accordance with the present invention; and, FIG. 2 is a schematic block diagram of the image signal processing circuit of the present invention.

In FIG. 1, a radiation imaging device 100 is shown comprising a plurality of scintillator elements 120 arranged in an array 122 and exposed to incident radiation 105. Each scintillator element is optically coupled to a cluster 150 of internal gain photodetectors 152, each of which is electrically coupled to an image signal processing circuit 200, which processes the electrical signals generated by photodetectors 152 to provide imaging signals S to the device's display memory and analysis equipment 280.

Incident radiation 105 typically comprises x-rays or gamma rays. The structure of the imaging device of this invention is, however, adaptable to the detection of other types of radiation provided appropriate scintillator material and radiation absorbent material in the interstitial barriers are selected. For ease of description, incident radiaiton is referred to herein as "rays", although, dependent upon the type of radiation to be detected, particles or other nomenclature known in the art may similarly be used to describe the radiation. "Radiation" is used to refer to the electromagnetic energy the imaging device is to detect (e.g., gamma rays), and the words "light" or "optical" are used to refer to the light energy or photons that are produced by the scintillator material when it interacts with the incident radiation. In typical imaging devices, the energy level of the incident radiation ranges between about 40 Kev and 500 Kev. In this energy range, typical interactions between the incident radiation and the scintillator material include photoelectric absorption and Compton scattering. Both of these processes result in electrons being emitted from atoms in the scintillator that are struck by the incident ray, and as these electrons pas through the scintillator material their energy is converted to visible radiant light energy A collimator 110 is disposed adjacent to scintillator array 122 so that the collimator overlies the scintillator array. Collimator 110 is positioned on imaging device 100 so that radiation incident on the device must pass through collimator passages 112 to enter scintillator elements 120. For ease of illustration, only a limited number of passages 112 are shown in FIG. 1; it should be noted, however, that collimator 120 would typically have a large number of such passages which would be in coincidence with the underlying scintillator elements. The collimator preferably is comprised of lead.

The scintillator elements forming array 122 typically form an $M \times N$ matrix, but alternatively can be in any shape appropriate for the employment of a particular device. The scintillator elements typically have a parallelepiped shape, and may, by way of example and not limitation, have cross-sectional dimensions of 2 mm $\times$ 2 mm and a depth of 5 mm. The scintillator array can be formed by cutting, or dicing, the elements from one block of scintillator material or alternatively the elements can be individually "grown" by evaporation or other known techniques such as sputtering or chemicall vapor deposition. In a large area array, such as would be used for medical imaging purposes, an array may typically have many thousands of scintillator elements and have outer dimensions of about 40 cm/by 50 cm. Scintillator elements 120 preferably are formed of a material having a relatively high efficiency for converting the incident radiation to optical energy, a relatively fast decay constant, and good optical transparency. Cesium iodide has proven to be a good scintillator material for the detection of gamma rays, having a conversion efficiency of 11.2%, a decay constant of 1 microsecond, and a refractive index of 1.8. Alternatively, other known scintillator materials may be used in the device of the present invention.

In accordance with the present invention, interstitial barriers 130 are disposed between the scintillator elements 120 so as to separate each scintillator element from adjoining elements. Interstitial barriers 130 comprise a material that effectively absorbs incident and secondary radiation rays, thereby substantially preventing radiation rays from passing between scintillator elements. A material having a high atomic number (a high Z material, e.g., one that has an atomic number greater that about 50) typically is an effective absorber of radiation having the energy levels of the radiation to be detected by the device and the energy levels of typical secondary rays generated when the incident radiation interacts with the scintillator material, as in photoelectric absorption. For example, any of tungsten, platinum, and silver may advantageously be used as radiation absorbent material. Such a radiation absorptive barrier is particularly important in large area devices to ensure good spatial resolution, i.e. determination of the location on the array where the incident radiation ray strikes.

Optically reflective layer 132 is disposed between the adjoining surfaces of interstitial barriers 130 and the scintillator elements, and across the portion of scintillator array 122 through which the incident radiation enters. Optically reflective layer 132 serves to isolate the scintillator elements from one another by confining within one scintillator element the visible light generated by the absorption of incident radiation in the element. Reflective layer 132 comprises a relatively thin, i.e., about 0.1 μm to 0.5 μm, layer of silver, aluminum, or similar material that is optically reflective and radiation transmissive, i.e. it does not substantially interact with the incident radiation. Reflective layer can be, but need not necessarily be, deposited on all scintillator element surfaces in one deposition step.

A cluster 150 of internal gain photodetectors 152 is optically coupled to each scintillator element 120 in accordance with this invention. Each cluster typically comprises four or more photodetectors which are disposed on a substrate 154 to receive light photons emanating from the adjoining surface of one of scintillator elements 120. The internal gain photodetectors are advantageously avalanche photodiodes, or can alternatively be bipolar amorphous phototransistors or similar high gain photodetectors. The arrangement with multiple photodetectors in a cluster coupled to one scintillator element is advantageously used in a large area imager as that structure allows the use of smaller size photodetectors, which in turn have smaller internal capacitances, thus enabling each photodetector to detect lower energy level radiation (which generates proportionally fewer light photons per absorption event).

Figure 2:
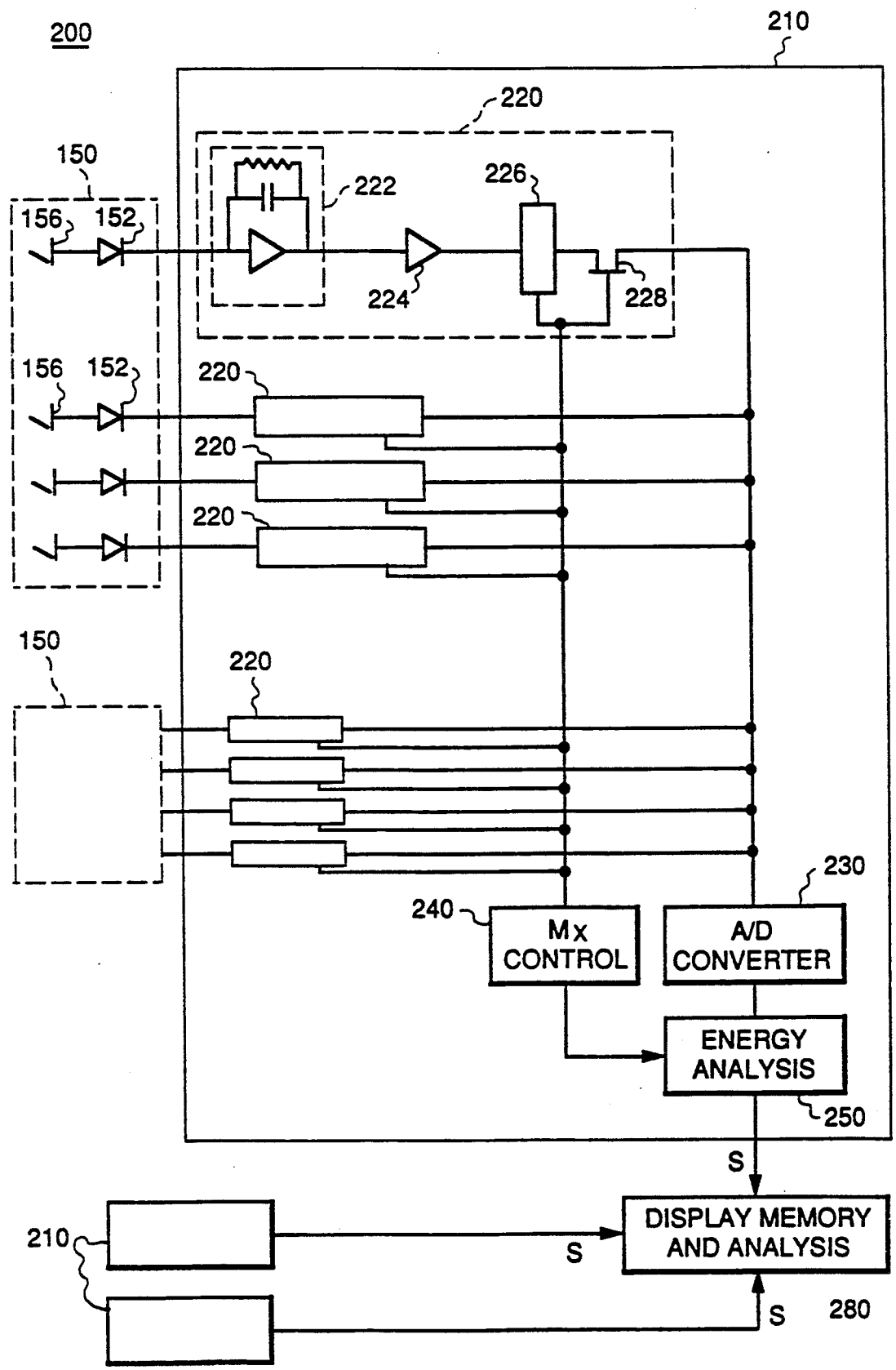

Image signal processing circuit 200 is electrically coupled to receive the signals generated by each photodetector 152, amplify and process the signal, and to generate an imaging signal S that is supplied to the device display and analysis equipment 280. As is illustrated in FIG. 2, image signal processing circuit 200 comprises a plurality of subgroup processing circuits 210, each of which is comprised of a plurality of detect and hold circuits 220 coupled to respective photodetectors, and components to process the signals received from the detect and hold circuits into digital imaging signals S.

Each photodector 152 in cluster 150 is connected to a common voltage bias supply 156 and to its respective detect and hold circuit 220. For illustration purposes in FIG. 2, detail is shown for only one cluster and one detect and hold circuit 220. The detect and hold circuit includes a charge sensitive integrating amplifier 222, a shaping amplifier 224, a peak detector 226 and a multiplex sampling switch 228. These components are electrically coupled to photodetector 152 so that an electrical pulse generated by the photodetector in response to light photons is integrated and amplified by charge sensitive amplifier 222, shaped by shaping amplifier 224 to have distinct rise and fall times, and detected and stored by peak detector 226.

In accordance with the present invention, peak detector 226 is coupled to an analog to digital converter 230 via multiplex sampling switch 228. A multiplex control circuit 240 selectively individually controls the condition of respective multiplex sampling switches 228 in the plurality of detect and hold circuits in subgroup processing circuit 210 so that the signals stored in the respective peak detectors 226 are sequentially conducted to an analog-to-digital converter 230. As multiplex control circuit 240 selectively activates sampling switch 228, the multiplex control circuit is correspondingly selectively coupled to and resets the peak detector so that the peak detector is ready to detect the next pulse; this sequence is repeated as the multiplex control circuit "sweeps" through each of the respective detect and hold circuits in the subgroup processing circuit. Analog to digital converter 230 is electrically coupled to an energy analysis circuit 250 so that the now-digitized pulse from the detect and hold circuit passes through this filter circuit which provides discrimination based on the magnitude of the detected pulse; pulses corresponding to incident radiation below a predetermined energy level are rejected by circuit 250 as representing background or secondary radiation, while pulses corresponding to an energy level above a predetermined level are rejected as reflecting a pile-up, or multiple detections within the sampling time frame. Multiplex control circuit 240 is also coupled to energy analysis circuit 250 to provide a signal corresponding to the detect and hold circuit being sampled by the multiplex control which in turn provides the location on the array of the detected radiation. The output signal generated by energy analysis circuit 250 is the imaging signal S, which corresponds to the energy level and the location on the array of the detected incident radiation.

Each subgroup processing circuit is coupled to a plurality of clusters of photodetectors and is able to process the signals generated by several hundred photodectors. In a typical arrangement, approximately 500 photodetectors making up over 100 clusters are coupled to one subgroup processing circuit. A large area array having about 40,000 photodetectors would have about 80 subgroup processing circuits, each of which would provide imaging signals to device display memory and analysis equipment 280.

In operation, device 100 of FIG. 1 is positioned in the path of the radiation desired to be detected. Rays of incident radiation emanating directly from the subject under examination will travel in a path so as to pass through channels 112 in collimator 110 and enter scintillator elements 120, whereas incident radiation that has been scattered as it passes from the subject under examination to the detection device will typically travel at some angle to the plane of the collimator and thus will not be able to traverse any of the channels 112. Radiation absorbent interstitial barriers 130 result in each scintillator element being isolated from adjoining elements, thus substantially eliminating cross talk between the elements. Interaction between the incident radiation and the scintillator material result in the generation of light photons; due to optically reflective coating 132, light photons will generally be directed toward the surface of the scintillator element that is optically coupled to photodetectors 152. Multiple internal gain photodetectors are optically coupled to each scintillator element, providing improved low light level sensitivity over circuits having larger photodetectors. The signal from each photodetector 152 is amplified and stored in its respective detect and hold circuit 220 (FIG. 2). Multiplexing means 240 allow individual sampling of the pulses generated by each detect and hold circuit 220, further increasing the sensitivity of device 100 (FIG. 1) over arrangements in which all photodetectors are coupled only to an amplifier on a row and column of the array. The sampled pulse is then further processed to be digitized and filtered to ensure the signal represents incident radiation within a selected energy range, i.e. is of the energy spectrum of interest; this imaging signal, generated by each of the subgroup processing circuits 210 (FIG. 2), is conducted to display memory and analysis equipment 280 for the device to produce a visual display or for other analysis.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A large area radiation imaging device comprising:
   a plurality of scintillator elements arranged in an array, each of said elements being separated from adjoining elements by an interstitial barrier, said barrier comprising a radiation absorptive material;
   a plurality of clusters of internal gain photodetectors, each of said clusters comprising more than one photodetector;
   each of said scintillator elements being optically coupled to one of said clusters of internal gain photodetectors; and
   an image signal processing circuit comprising a plurality of subgroup processing circuits, each of said subgroup processing circuits being electrically coupled to a plurality of said clusters of photodetectors;
   each of said subgroup processing circuits having multiplexing means for sampling electrical signals generated by each of said photodetectors in said clusters coupled to said subgroup processing circuit so as to produce an imaging signal corresponding to the energy level of, and location on, said scintillator array of the detected incident radiation.

2. The device of claim 1 wherein said radiation absorptive material has a relatively high atomic number.

3. The device of claim 2 wherein said radiation absorbent material comprises one of the group consisting of tungsten, platinum, and silver.

4. The device of claim 1 including an optically reflective layer disposed between the adjoining surfaces of said interstitial barrier and said scintillator elements and over the surfaces said scintillator elements through which incident radiation enters said elements, said optically reflective layer substantially optically isolating each of said scintillator elements from adjoining scintillator elements.

5. The device of claim 4 wherein said optically reflective material comprises one of the group consisting of silver and aluminum.

6. The device of claim 1 wherein said scintillator elements comprise cesium iodide.

7. The device of claim 1 wherein said internal gain photodetectors comprise avalanche photodiodes.

8. The device of claim 1 wherein each of said subgroup processing circuits comprises:
   a plurality of detect and hold circuits, each of said detect and hold circuits being electrically coupled to one of said photodetectors and generating an amplified output signal corresponding to the signal generated by said photodetector;
   a multiplex control circuit coupled to each of said detect and hold circuits;
   an analog to digital converter coupled to sequentially receive said amplified output signals from said detect and hold circuits; and
   an energy analysis circuit coupled to said analog to digital converter for generating an imaging signal in response to pulses from said analog to digital converter.

9. The device of claim 8 wherein each of said detect and hold circuits comprises a charge sensitive amplifier, a shaping amplifier coupled to the output of said charge sensitive amplifier, a peak detector coupled to the output of said shaping amplifier, and a sampling switch coupled to the output of said peak detector, the condition of said sampling switch being controlled by said multiplex control circuit.

10. The device of claim 9 wherein said peak detector is selectively coupled to said multiplex control circuit such that said peak detector is reset by said multiplex control circuit in correspondence with the operation of said sampling switch.

11. The device of claim 9 wherein each of said subgroup processing circuits is electrically coupled to about 500 photodetectors.

12. The device of claim 9 wherien said energy analysis circuit comprises a filter so as to generate an imaging signal only when the detected incident radiation has an energy level within a selected energy range.

13. A large area radiation imaging device comprising:
   a plurality of scintillator elements arranged in an array, each of said elements being separated from adjoining elements by an interstitial barrier, said barrier comprising a radiation absorptive material;
   a plurality of clusters of internal gain photodetectors, each of said clusters comprising more than one photodetector;
   each of said scintillator elements being optically coupled to one of said clusters of internal gain photodetectors;
   an image signal processing circuit comprising a plurality of subgroup processing circuits, each of said subgroup processing circuits being electrically coupled to a plurality of said clusters of photodetectors; and
   display memory and analysis equipment, said equipment being electrically coupled to said subgroup processing circuits;
   each of said subgroup processing circuits comprising a plurality of detect and hold circuits and multiplexing means for sampling electrical signals generated by each respective one of said detect and hold circuits so as to produce an imaging signal corresponding to the energy level of, and location on, said scintillator array of the detected incident radiation.

14. The device of claim 13 wherein each of said subgroup processing circuits further comprises:
   an analog to digital converter coupled to receive amplified output signals from said detect and hold circuits; and
   an energy analysis circuit coupled to said analog to digital converter, said circuit generating an imaging signal in response to pulses from said analog to digital converter.

15. The device of claim 13 wherein each of said detect and hold circuits comprises a charge sensitive amplifier, a shaping amplifier coupled to the output of said charge sensitive amplifier, a peak detector coupled to the output of said shaping amplifier, and a sampling switch coupled to the output of said peak detector, the condition of said sampling switch being controlled by said multiplex control circuit.

16. The device of claim 13 further comprising a collimator disposed on the portion of said scintillator array through which the incident radiation enters.

* * * * *